(12) United States Patent
Park et al.

(10) Patent No.: US 9,870,071 B2
(45) Date of Patent: Jan. 16, 2018

(54) METHOD AND APPARATUS FOR USER AUTHENTICATION

(71) Applicant: Samsung Electronics Co., Ltd., Gyeonggi-do (KR)

(72) Inventors: Ji-Yoon Park, Gyeonggi-do (KR); Jae-Yung Yeo, Gyeonggi-do (KR); Seung-Eun Lee, Seoul (KR); Seong-Min Je, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 18 days.

(21) Appl. No.: 14/176,215

(22) Filed: Feb. 10, 2014

(65) Prior Publication Data

US 2014/0232700 A1 Aug. 21, 2014

(30) Foreign Application Priority Data

Feb. 20, 2013 (KR) ........................ 10-2013-0018280

(51) Int. Cl.
*G06F 3/0354* (2013.01)
*G06F 21/36* (2013.01)
*G06F 21/83* (2013.01)
*G06F 21/31* (2013.01)
*G06F 21/32* (2013.01)

(52) U.S. Cl.
CPC .......... *G06F 3/03545* (2013.01); *G06F 21/36* (2013.01); *G06F 21/83* (2013.01); *G06F 21/31* (2013.01); *G06F 21/32* (2013.01)

(58) Field of Classification Search
CPC ...... G06F 3/03545; G06F 21/83; G06F 21/36; G06F 21/31; G06F 21/32
See application file for complete search history.

(56) References Cited

U.S. PATENT DOCUMENTS

| | | | |
|---|---|---|---|
| 6,417,845 B1 | 7/2002 | Chen et al. | |
| 2002/0042885 A1* | 4/2002 | Eskandarian | G06F 21/32 726/6 |
| 2002/0153416 A1* | 10/2002 | Kroll | G06K 9/00335 235/380 |
| 2003/0001818 A1 | 1/2003 | Katagiri et al. | |
| 2005/0190163 A1* | 9/2005 | Sarasmo et al. | 345/179 |
| 2008/0128180 A1* | 6/2008 | Perski | G06F 3/046 178/18.03 |
| 2009/0019292 A1 | 1/2009 | Fransson et al. | |
| 2012/0242603 A1* | 9/2012 | Engelhardt et al. | 345/173 |

(Continued)

FOREIGN PATENT DOCUMENTS

| | | |
|---|---|---|
| CN | 1425150 A | 6/2003 |
| KR | 2001-0106754 A | 12/2001 |
| KR | 2002-0003686 A | 1/2002 |

(Continued)

*Primary Examiner* — Jimmy H Nguyen
*Assistant Examiner* — Yaron Cohen
(74) *Attorney, Agent, or Firm* — Cha & Reiter, LLC

(57) ABSTRACT

An apparatus and a method for managing security of a terminal which increases reliability of an electronic signature. The apparatus includes a controller for detecting coordinate values of input positions of an electronic pen as interruption information when the interruption is received, and a memory for storing the detected input positions as additional electronic signature information.

20 Claims, 12 Drawing Sheets

(56) References Cited

U.S. PATENT DOCUMENTS

2013/0011065 A1* 1/2013 Yoshida .................. 382/187
2014/0003675 A1* 1/2014 Li .......................... G06F 21/32
                                                    382/123

FOREIGN PATENT DOCUMENTS

| KR | 2002-0017356 A   | 3/2002  |
| KR | 2002-0021189 A   | 3/2002  |
| KR | 10-2007-0085366 A | 8/2007  |
| KR | 10-1149695 B1    | 5/2012  |
| WO | 2009/137552 A1   | 11/2009 |

* cited by examiner

METHOD AND APPARATUS FOR USER AUTHENTICATION

CROSS RELATED APPLICATION

This application claims the priority under 35 U.S.C. §119(a) to Korean Application Serial No. 10-2013-0018280, which was filed in the Korean Intellectual Property Office on Feb. 20, 2013, the entire content of which is hereby incorporated by reference.

BACKGROUND

1. Technical Field

The present disclosure relates generally to an apparatus and a method for managing security of a terminal, and more particularly, to an apparatus and a method for managing security of a terminal which can improve reliability of an electronic signature.

2. Description of the Related Art

An electronic signature using an electronic pen has been already used widely as a user authentication method. The electronic signature has low reliability since it has high falsifiability in spite of high utilization due to its high collectivity and common use.

A pattern or password used as a security function as well as the electronic signature may be easily leaked to another person through an input operation of a user.

SUMMARY

Accordingly, an aspect of the present disclosure is to provide an apparatus and a method for managing security of a terminal which can increase reliability of an electronic signature used as a security function using a button of an electronic pen.

Another aspect of the present invention is to provide an apparatus and a method for managing security of a terminal which can increase reliability of a pattern or password used as a security function using a button of an electronic pen.

In accordance with an aspect of the present invention, an apparatus for managing security of a terminal is provided may include: an apparatus for managing security of a terminal includes: a controller for detecting coordinate values of input positions of an electronic pen as interruption information when the interruption is received; and a memory for storing the detected input positions as additional electronic signature information. It is understood as used herein, that the interruption may be in the form of a command, input, instruction or any other signal transmitted from the pen to the terminal.

In accordance with another aspect of the present invention, a method of managing security of a terminal includes: storing in a memory an interruption from an electronic pen while an electronic signature is input through a controller by using the electronic pen in an electronic signature security registration mode, detecting coordinate values of input positions of the electronic pen as interruption information when the interruption is received; detecting an interruption from an electronic pen through the controller while an electronic signature is input by using the electronic pen in an electronic signature security use mode, detecting coordinate values of input positions of the electronic pen as interruption information when the interruption is received; and comparing the interruption of the storing step with the interruption of the detecting step.

In accordance with another aspect of the present invention, a method of managing security of a terminal may include: receiving an interruption from an electronic pen while an electronic signature is input by using the electronic pen in an electronic signature security registration mode, detecting coordinate values of input positions of the electronic pen as interruption information when the interruption is received; and inserting the detected interruption information into electronic signature information as additional authentication information on the electronic signature and storing the electronic signature information.

The present invention has an effect of increasing reliability of an electronic signature used as a security function and easily and safely performing a user authentication by providing an apparatus and a method for managing security of a terminal. Also, the present invention has an effect of increasing reliability of a pattern or password used as a security function and easily and safely performing a user authentication.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Figure 1:
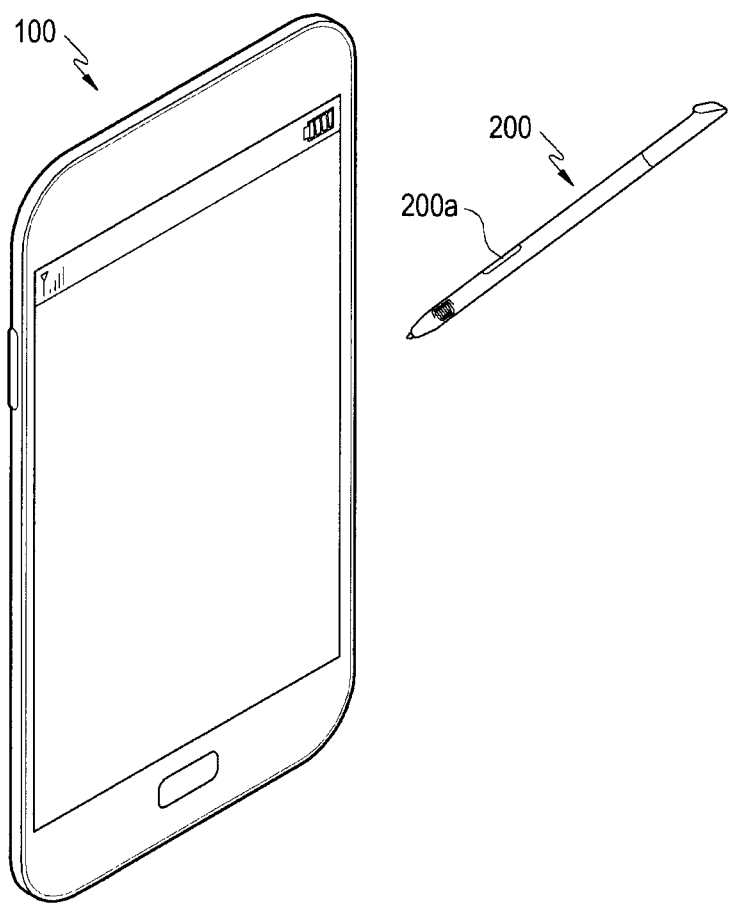
FIG. 1 illustrates a terminal using an electronic pen according to an embodiment of the present invention.

Hereinafter, various embodiments of the present invention will be described with reference to the accompanying drawings. In the following description, the same elements will be designated by the same reference numerals although they are shown in different drawings.

A terminal according to an embodiment of the present invention can be a portable terminal or a fixed terminal.

Here, the portable terminal corresponds to a movable electronic device which can be easily carried, and may include a video telephone, a mobile phone, a smart phone, an International Mobile Telecommunication 2000 (IMT-2000) terminal, a WCDMA terminal, a Universal Mobile Telecommunication Service (UMTS) terminal, a Personal Digital Assistant (PDA), a Portable Multimedia Player (PMP), a Digital Multimedia Broadcasting (DMB) terminal, an E-book, a portable computer (notebook, a tablet PC or the like), a digital camera or the like. Further, the fixed terminal includes a desktop personal computer or the like.

FIG. 1 illustrates a terminal using an electronic pen according to an embodiment of the present invention.

Referring to FIG. 1, a terminal 100 includes a detachable electronic pen 200, and can perform various input operations or a particular function by using the electronic pen 200. A button 200a is arranged in a predetermined position of the electronic pen 200.

In operation, when an electronic signature to be used as a security function using the electronic pen 200 is input, the terminal 100 detects coordinate values input in a state where the button 200a of the electronic pen 200 is pressed from values of coordinates in which the electronic signature is input as interruption information and uses the detected interruption information as additional electronic signature information.

Further, when the electronic signature to be used as the security function using the electronic pen 200 is input, the terminal 100 detects the number of times that the button is pressed and detected according to a push operation of the button 200a of the electronic pen 200 at a predetermined interval, time for which the button is pressed, or a push pattern of the button generated by combining the number of times that the button is pressed and the time for which the button is pressed as interruption information. The terminal 100 then uses the detected interruption information as electronic signature information.

In addition, when the electronic signature to be used as the security function using the electronic pen 200 is input, the terminal 100 detects coordinate values input in a state where the button 200a of the electronic pen 200 is pressed from values of coordinates in which the pattern or password is input as interruption information and then uses the detected interruption information as additional electronic signature information.

The configuration of the terminal will be described in detail with reference to FIG. 2.

Figure 2:
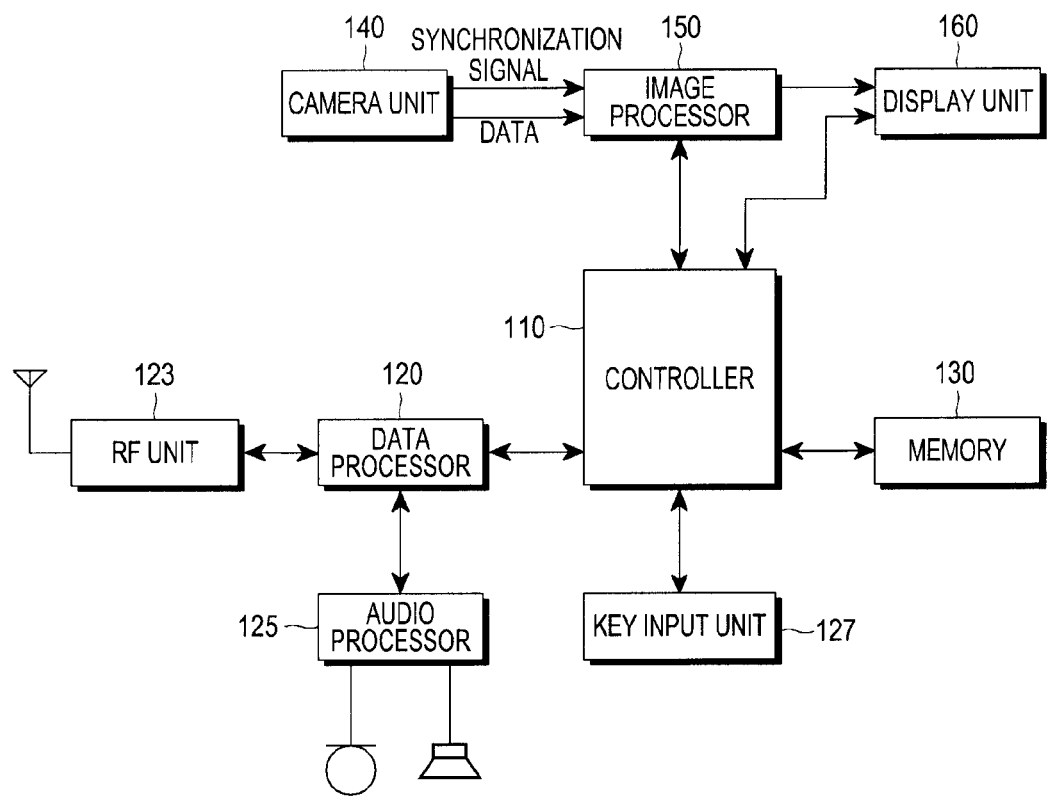
FIG. 2 illustrates a configuration of a terminal according to an embodiment of the present invention.

FIG. 2 illustrates the configuration of the terminal according to an embodiment of the present invention.

Referring to FIG. 2, an RF unit 123 performs a wireless communication function of the terminal. The RF unit 123 includes an RF transmitter for up-converting and amplifying a frequency of a transmitted signal and an RF receiver for low-amplifying a received signal and down-converting a frequency. A data processor 120 includes a transmitter for encoding and modulating the transmitted signal and a receiver for demodulating and decoding the received signal. That is, the data processor 120 may be configured by a modem and a codec. Here, the codec includes a data codec for processing packet data and an audio codec for processing an audio signal, such as a voice.

An audio processor 125 performs a function of reproducing a reception audio signal output from the audio codec of the data processor 120 or transmitting a transmission audio signal generated from a microphone to the audio codec of the data processor 120.

A key input unit 127 includes keys for inputting number and character information and function keys for setting various functions.

A memory 130 may include a program memory and data memories. The program memory stores programs for controlling programs controlling general operations of the terminal. Further, when an electronic signature to be used as a security function using the electronic pen 200 is input, the program memory stores programs for controlling such that coordinate values input in a state where the button 200a of the electronic pen 200 is pressed are detected from values of coordinates in which the electronic signature is input as interruption information and the detected interruption information is used as additional electronic signature information. Moreover, when the electronic signature to be used as the security function using the electronic pen 200 is input, the program memory stores programs for controlling such that coordinate values input in a state where the button 200a of the electronic pen 200 are detected from values of coordinates in which the pattern or password is input as interruption information and the detected interruption information is used as additional electronic signature information. In addition, the data memory performs a function of temporarily storing data generated while executing the programs.

Further, when the electronic signature is input by using the electronic pen 200 in an electronic signature security registration mode according to an embodiment of the present invention, the memory 130 stores electronic signature information including an input electronic signature image, basic authentication information (for example, values of coordinates in which the electronic signature is input, a feature point, a speed, and/or writing pressure feeling), and interruption information. At this time, the interruption information indicates coordinate values input in a state where the button 200a of the electronic pen 200 is pressed from the coordinate values of the electronic signature input using the electronic pen 200.

Moreover, the interruption information indicates the number of times that the button is pressed, generated through a push operation of the button 200a of the electronic pen 200, in a state where the electronic pen 200 maintains a predetermined interval from the display unit 160, time for which the button is pressed, or a push pattern of the button generated by combining the number of times that the button is pressed and the time for which the button is pressed after an input operation for the electronic signature is performed using the electronic pen 200

In addition, when a pattern input operation for connecting the predetermined number of points among a plurality of points is performed by using the electronic pen 200 in a pattern security registration mode according to an embodiment of the present invention, the memory 130 stores pattern information including an input pattern type and interruption information. At this time, the interruption information indicates coordinate values for particular points input in a state where the button 200a of the electronic pen 200 is pressed among coordinate values for the predetermined number of points input using the electronic pen 200.

Further, when an input operation for a key is performed using the electronic pen 200 in a password security registration mode according to an embodiment of the present invention, the memory 130 stores password information including a password corresponding to input keys and interruption information. At this time, the interruption information indicates a key value input in a state where the button 200a of the electronic pen 200 is pressed among the input keys by using the electronic pen 200.

The controller 110 performs a function of controlling general operations of the terminal.

According to a first embodiment of the present invention, when an interruption is received from the electronic pen 200 while the electronic signature is input by using the electronic pen 200 in an electronic signature security registration mode, the controller 110 detects coordinate values for input positions of the electronic pen 200 as interruption information when the interruption is received, and then controls such that the detected interruption information is stored in the memory 130 as additional authentication information on the electronic signature.

The coordinate values of the input positions of the electronic pen 200 include coordinate values from a position where the input operation for the electronic signature starts to a position where the input operation ends in a state where the button of the electronic pen 200 is pressed.

The interruption is generated by pressing the button arranged in the electronic pen 200.

When the button arranged in the electronic pen 200 is pressed, the electronic pen transmits a particular frequency to the terminal. Accordingly, the controller 110 of the terminal receives the particular frequency transmitted from the electronic pen, that is, the interruption for informing that the button has been pressed.

As a result, when the input operation of the electronic signature is performed in particular positions in a state where the button 200a of the electronic pen 200 is pressed while the electronic signature is input by using the electronic pen 200 during the electronic signature security registration mode, the controller 110 detects coordinates values for the particular positions as interruption information and controls such that the detected interruption information is inserted into electronic signature information as additional authentication information on the electronic signature and then is stored in the memory 130.

At this time, the coordinate values for the particular positions includes coordinate values from a position where the input operation for the electronic signature starts to a position where the input operation ends in the state where the button 200a of the electronic pen 200 is pressed, and the number of particular positions may be one or more.

Further, according to a second embodiment of the present invention, when the input operation for the electronic signature is performed by using the electronic pen 200 during the electronic signature security registration mode and then a re-input operation is generated in particular positions where the electronic signature has been already input by using the electronic pen 200 having the pressed button 200a, the controller 110 detects coordinate values for particular positions where the re-input operation is generated as interruption information and controls such that the detected interruption information is inserted into electronic signature information as additional authentication information on the electronic signature and then is stored in the memory 130.

At this time, the coordinate values for the particular positions correspond to button interruption coordinate values from a position where the input operation for the electronic signature starts to a position where the input operation ends in the state where the button 200a of the electronic pen 200 is pressed, and the number of particular positions may be one or more.

In addition, according to a third embodiment of the present invention, when the input operation for the electronic signature is performed by using the electronic pen 200 and then a push operation of the button 220a of the electronic pen 200 is generated during the electronic signature security registration mode, the controller 110 detects the number of times that the button is pressed, time for which the button is pressed, or a push pattern of the button generated by combining the number of times that the button is pressed and the time for which the button is pressed as interruption information and controls such that the detected interruption information is inserted into electronic signature information as additional authentication information on the electronic signature and then is stored in the memory 130.

At this time, the button of the electronic pen 200 may be pressed in a state where the electronic pen 200 touches a particular point of the display unit 160 or a state where the electronic pen 200 is located within a predetermined range from the display unit 160 without touching the display unit 160.

When the button 200a of the electronic pen 200 is pressed in the state where the electronic pen 200 does not touch the display unit 160, that is, the state where the electronic pen 200 is located within a predetermined range (for example, 1 cm), the controller 110 receives a particular frequency generated whenever the button 200a is pressed and accordingly determines the number of times that the button 200a is pressed and the time for which the button 200a is pressed. The controller 110 can detect to approach the electronic pen without pressing the electronic pen. In the present invention, after the detecting of the approach to the electronic pen, the controller determines the generated particular frequency whenever the button is pressed through the number of times that the button is pressed and the time for which the button is pressed.

Further, according to an embodiment of the present invention, in a case where the electronic signature is set as the security function, when the electronic signature is input according to a request for the electronic signature, the controller 110 compares information on the input electronic signature with information on the electronic signature stored in the memory. When the input electronic signature information, the stored electronic signature information, and the interruption information are all equal, the controller 110 controls such that the authentication of the input electronic signature is succeeded and then the corresponding function is performed.

Moreover, according to an embodiment of the present invention, when a pattern input operation for particular points is performed in the state where the button of the electronic pen is pressed while the pattern input operation for connecting the predetermined number of points among a plurality of points by using the electronic pen during a pattern security registration mode, the controller 110 detects coordinate values for the particular points as interruption information and controls such that pattern information including the detected interruption information is stored in the memory 130.

Furthermore, according to an embodiment of the present invention, in a case where the security function is set as the pattern, when the pattern is input according to a request for the pattern input, the controller 110 compares information on the input pattern with information on the pre-stored pattern. When the input pattern information, the stored pattern information, and the interruption information are all equal, the controller 110 controls such that the authentication for the input pattern is succeeded and then the corresponding functions is performed.

In addition, according to an embodiment of the present invention, when a particular key is input in the state where the button of the electronic pen is pressed while predetermined keys of a keypad are input by using the electronic pen to input a password during a password security registration mode, the controller 110 detects the input particular key value as interruption information and controls such that password information including the detected interruption information is stored in the memory 130.

Further, according to an embodiment of the present invention, in a case where the password is set as the security function, when the password is input according to a request for the password input, the controller 110 compares information on the input password with information on the pre-stored password. When the input password information, the stored password information, and the interruption information are all equal, the controller 110 controls such that the authentication for the input password is succeeded and then the corresponding function is performed.

The camera unit 140 photographs image data, and includes a camera sensor for converting a photographed optical signal to an electrical signal and a signal processor for converting an analog image signal photographed by the camera sensor to digital data. For example, the camera sensor may be a CCD or a CMOS sensor. The signal processor may be implemented by a Digital Signal Processor (DSP). Further, the camera sensor and the signal processor may be integrally or separately implemented.

The image processor 150 performs Image Signal Processing (ISP) for displaying an image signal output from the camera unit 140 on the display unit 160, and the image processor 150 performs functions such as gamma correction, interpolation, spatial change, image effect, image scale, AWB, AE, AF and the like. Accordingly, the image processor 150 processes the image signal output from the camera unit 140 in the unit of frames and outputs frame image data in accordance with a characteristic and a size of the display unit 160. Further, the image processor 150 includes an image codec and performs a function of compressing the frame image data displayed on the display unit 160 according to a set method or reconstructing the compressed frame image data into original frame image data. Here, the image codec may be a JPEG codec, an MPEG4 codec, a Wavelet codec or the like. It is assumed that the image processor 150 includes an On Screen Display (OSD) function, and the image processor 150 may output screen display data according to a size of the displayed screen under a control of the controller 110.

The display unit 160 displays an image signal output from the image processor 150 and displays user data output from the controller 110. Here, the display unit 160 may use an LCD. In this case, the display unit 160 may include an LCD controller, a memory for storing image data, and an LCD display device. Here, when the LCD is implemented in a touch screen type, the LCD may operate as an input unit. At this time, the display unit 160 may display keys, such as the key input unit 127.

Further, when the display unit 160 is implemented in the touch screen type and thus used as a touch screen unit, the touch screen unit may be configured by a Touch Screen Panel (TSP) including a plurality of sensor panels, and the plurality of sensor panels may include a capacitive sensor panel capable of recognizing a hand touch and an electromagnetic induction sensor panel capable of detecting a fine touch made by a touch pen.

A registration operation and an authentication operation for the security function in the terminal will be described with reference to FIGS. 3 to 10.

Figure 3:
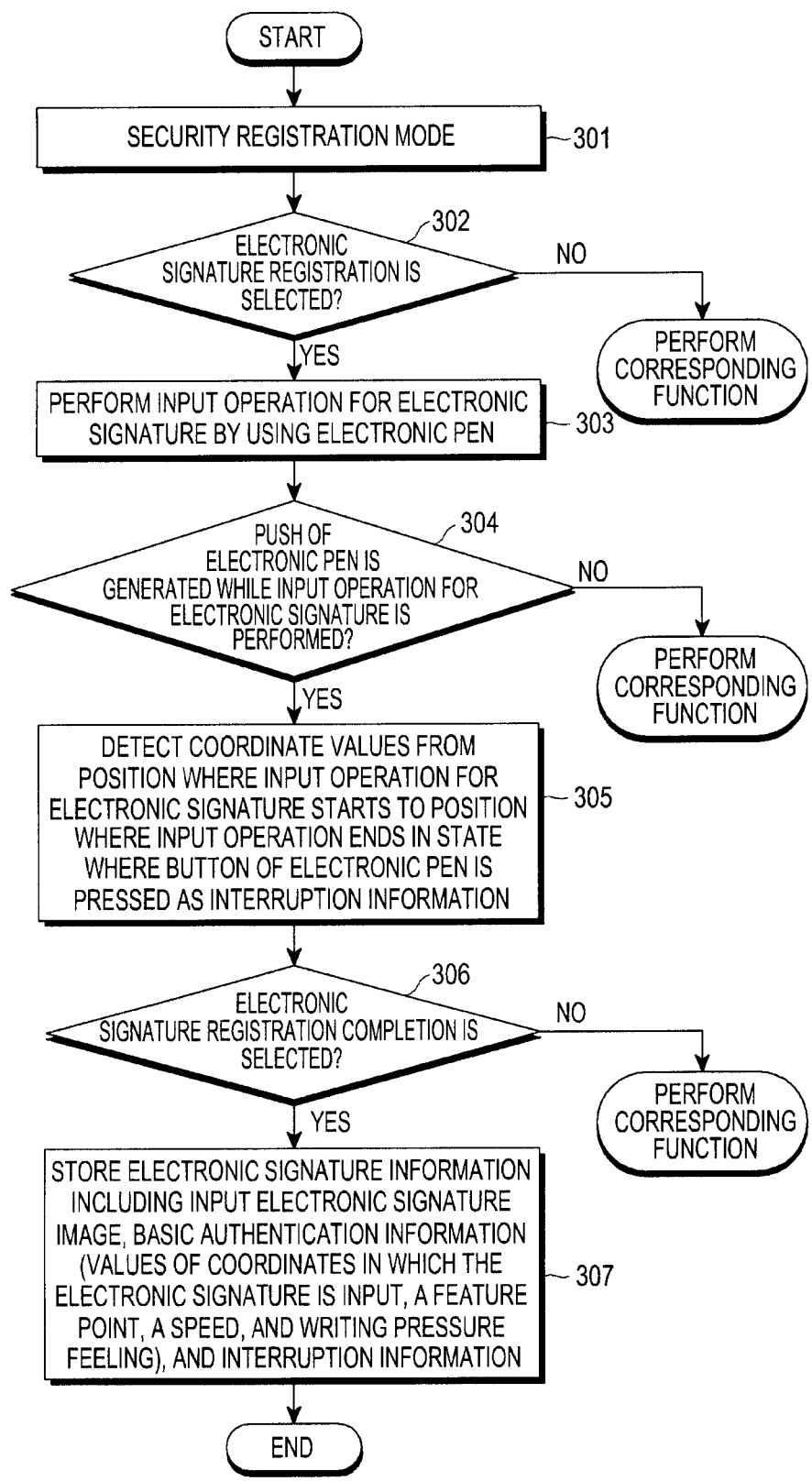
FIG. 3 is a flowchart illustrating an electronic signature registration process in a terminal according to a first embodiment of the present invention.

FIG. 3 is a flowchart illustrating an electronic signature registration process in the terminal according to a first embodiment of the present invention.

Referring to FIGS. 1 to 3, when an electronic signature registration is selected as the security function in a security registration mode in step 301, the controller 110 detects the selection and makes a request for an electronic signature input for the registration in step 302.

When the button 200a of the electronic pen 200 is pressed while the input operation for the electronic signature is performed in the display unit 160 by using the electronic pen 200 in step 303, the controller 110 detects the push of the button 200a in step 304, and detects coordinate values for particular positions where the electronic pen 200 is input as interruption information in step 305.

When the input operation for the electronic signature using the electronic pen 200 starts in the state where the button 200a is pressed, the controller 110 performs an operation of detecting coordinate values from a position where the input operation for the electronic signature using the electronic pen 200 having the pushed button 200a starts to a position where the input operation ends as the interruption information in step 305.

Through steps 304 and 305, while performing the electronic signature input operation for the registration by using the electronic pen 200 without the push of the button 200a, a user can perform the input operation for the electronic signature in a desired position in the state where the button 200a of the electronic pen 200 is pressed.

Accordingly, the controller 110 detects coordinate values of the input electronic signature in the state where the button 200a of the electronic pen 200 is pressed as separate interruption information and stores the detected interruption information as additional electronic signature information to additionally authenticate the electronic signature by using the interruption information in a future process of authenticating the electronic signature.

In general, the electronic signature may be forged by another person through repeated practice, but the interruption information can be recognized only by the person who inputs the electronic signature, so that the reliability of the electronic signature can be increased.

When the electronic signature is input through repeated performance of steps 304 and 305 and an electronic signature registration completion is selected, the controller 110 detects the input and selection in step 306, and proceeds to step 307 of storing electronic signature information including an original image of the electronic signature input by the user, basic authentication information, and the interruption information in the memory 130.

The basic authentication information may include values of coordinates in which the electronic signature is input, a feature point, a speed at which the electronic signature is input, and writing pressure feeling for the input of the electronic signature. The feature point indicates information on a particular part where a line is rapidly changed in the input electronic signature.

Figure 4:
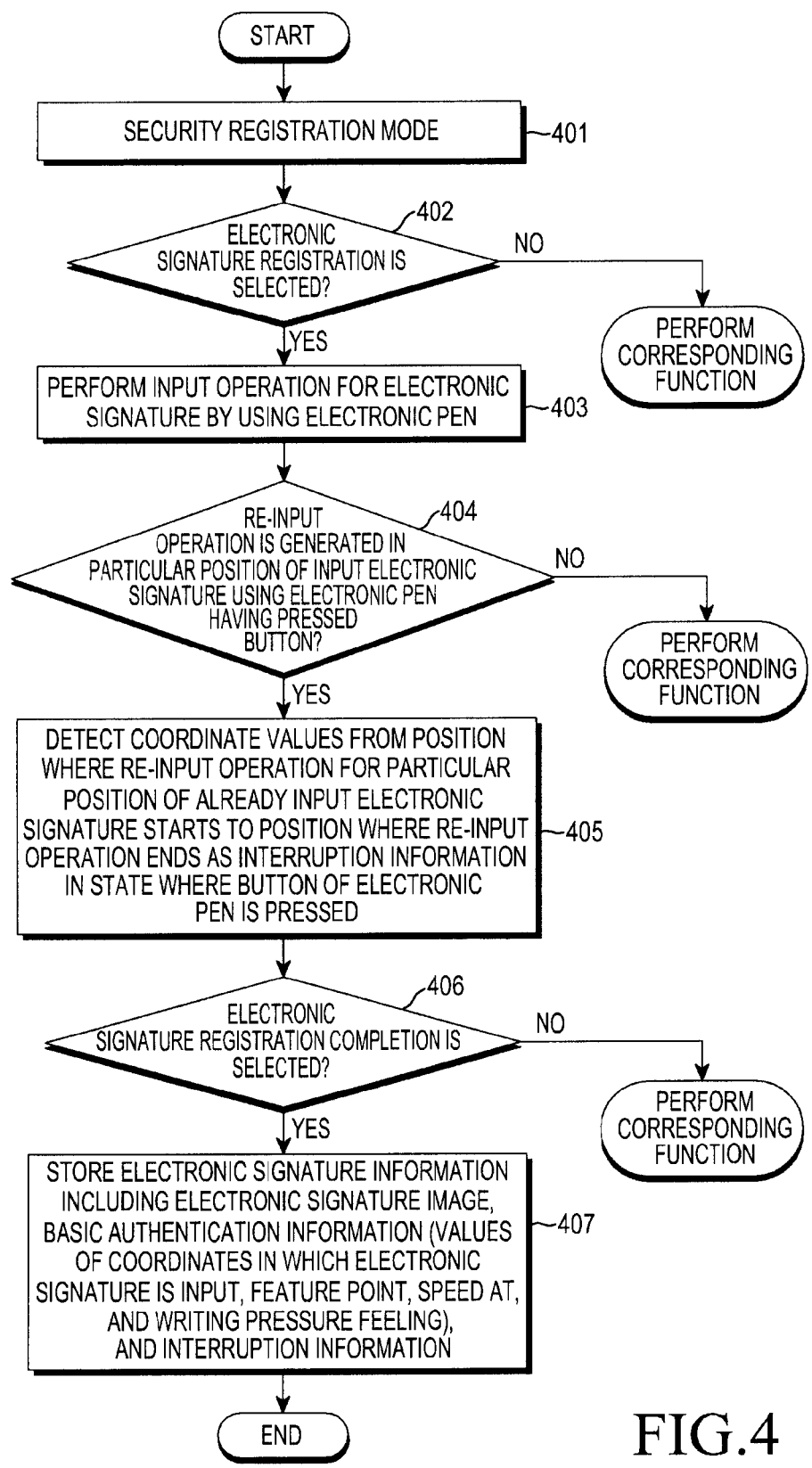
FIG. 4 is a flowchart illustrating an electronic signature registration process in a terminal according to a second embodiment of the present invention.

FIG. 4 is a flowchart illustrating an electronic signature registration process in the terminal according to a second embodiment of the present invention.

Referring to FIGS. 1, 2 and 4, when an electronic signature registration is selected as a security function in a security registration mode in step 401, the controller 110 detects the selection and makes a request for an input of the electronic signature to register the electronic signature in step 402.

When an input operation for the electronic signature is performed in the display unit 160 by using the electronic pen 200 in step 403 and then a re-input operation is performed in a particular position of the already input electronic device by using the electronic pen 200 having the pressed button 200a, the controller 110 detects a coordinate value of the particular position where the re-input operation is performed by using the electronic pen 200 in the state where the button 200a is pressed as interruption information in step 405.

In step 405, the controller 110 performs an operation of detecting button interruption coordinate values from a position where the re-input operation performed in the particular position of the already input electronic signature starts to a position where the re-input operation ends as the interruption information.

Through steps 404 and 405, the user performs the input operation of the electronic signature for the registration by using the electronic pen 200 without pressing the button 200a and then performs the re-input operation of the electronic signature in the state where the user presses the button 200a of the electronic pen 200 in the desired particular position of the already input electronic signature.

Accordingly, the controller 110 detects coordinate values of the re-input electronic signature in the state where the button 200a of the electronic pen 200 is pressed as separate interruption information and stores the detected interruption information as additional electronic signature information to additionally authenticate the electronic signature by using the interruption information in a future process of authenticating the electronic signature.

When the electronic signature is input through repeated performance of steps 404 and 405 and an electronic signature registration completion is selected, the controller 110 detects the input and selection in step 406, and proceeds to step 407 of storing electronic signature information including an original image of the electronic signature input by the user, basic authentication information, and the interruption information in the memory 130.

The basic authentication information may include values of coordinates in which the electronic signature is input, a feature point, a speed at which the electronic signature is input, and writing pressure feeling for the input of the electronic signature. The feature point indicates information on a particular part where a line is rapidly changed in the input electronic signature.

Figure 5:
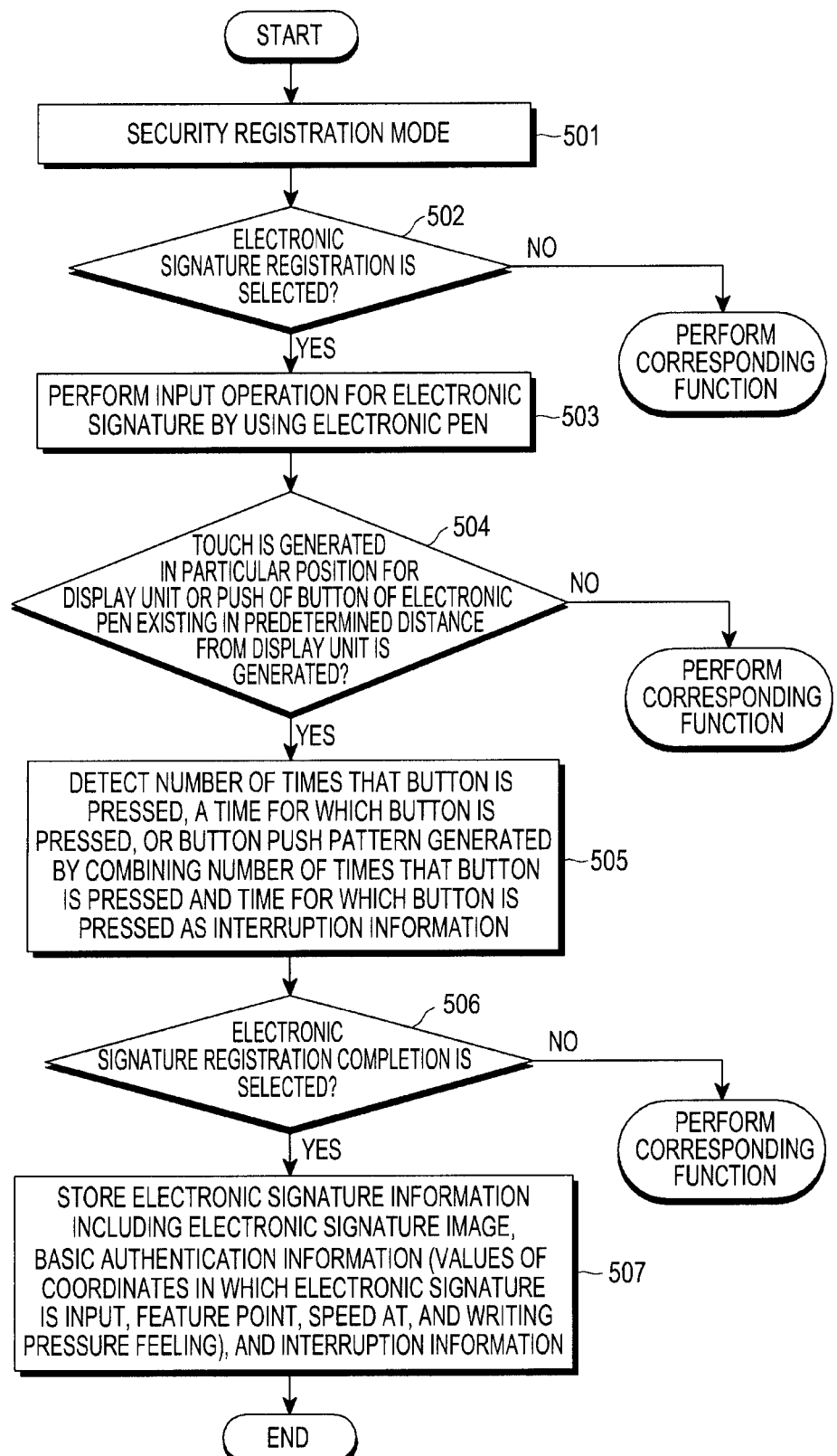
FIG. 5 is a flowchart illustrating an electronic signature registration process in a terminal according to a third embodiment of the present invention.

FIG. 5 is a flowchart illustrating an electronic signature registration process in the terminal according to a third embodiment of the present invention.

Referring to FIGS. 1, 2 and 5, when an electronic signature registration is selected as a security function in a security registration mode in step 501, the controller 110 detects the selection and makes a request for an input of the electronic signature to register the electronic signature in step 502.

When an input operation for the electronic signature is performed in the display unit 160 by using the electronic pen 200 in step 503 and then the button 200a of the electronic pen 200 is pressed in a state where a particular point of the display unit 160 is touched or the electronic pen 200 is located with a predetermined distance from the display unit 160 without touching the display unit 160, the controller 110 detects the touch or push in step 504 and checks the number of times that the button is processed for a predetermined time and time for which the button is pressed.

The controller 110 performs step 505 of detecting the number of times that the button is pressed for a predetermined time, the time for which the button is pressed, or pattern information of the button generated by combining the number of times that the button is pressed and the time for which the button is pressed as separate interruption information.

Through steps 504 and 505, the user performs the input operation of the electronic signature for the registration by using the electronic pen 200 and then generates the push of the button 200a in accordance with the number of times that the button is pressed, the time for which the button is pressed, or the push pattern in a state where the electronic pen touches a particular point of the display unit 160 or the electronic pen is located within a predetermined distance from the display unit 160.

Accordingly, the controller 110 detects the number of times that the button 200a is pressed, the time for which the button is pressed, or the push pattern generated after the input operation of the electronic signature as separate interruption information and stores the detected interruption information as additional electronic signature information to additionally authenticate the electronic signature by using the interruption information in a future process of authenticating the electronic signature.

Although it has been described that the generated interruption information is detected after the input operation of the electronic signature as an example in the third embodiment, the input operation of the electronic signature may be performed after the detection of the generated interruption information.

When the electronic signature is input through repeated performance of steps 504 and 505 and an electronic signature registration completion is selected, the controller 110 detects the input and selection in step 506, and proceeds to step 507 of storing electronic signature information including an original image of the electronic signature input by the user, basic authentication information, and the interruption information in the memory 130.

The basic authentication information may include values of coordinates in which the electronic signature is input, a feature point, a speed at which the electronic signature is input, and writing pressure feeling for the input of the electronic signature. The feature point indicates information on a particular part where a line is rapidly changed in the input electronic signature.

Figure 6:
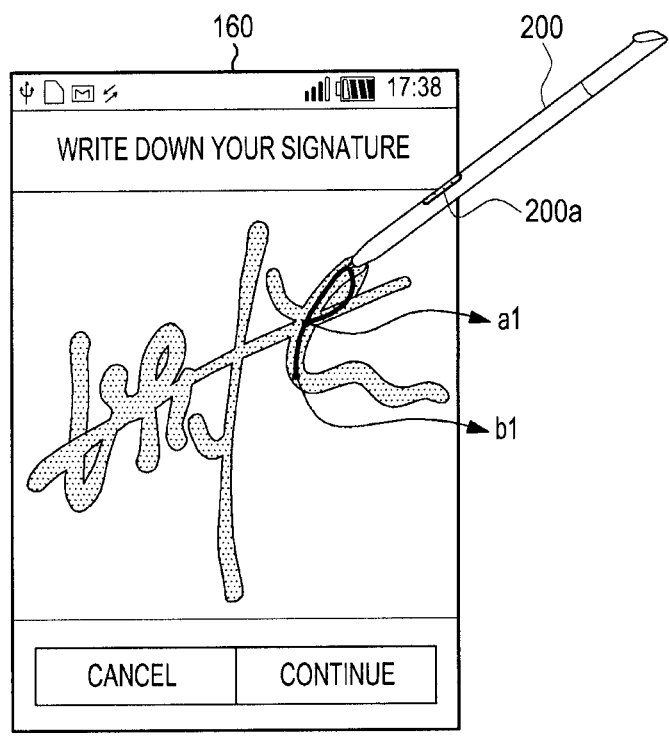
FIG. 6 is a diagram for describing an electronic signature registration operation in a terminal according to an embodiment of the present invention.

FIG. 6 is a diagram for describing an electronic signature registration operation in the terminal according to an embodiment of the present invention, and illustrates the electronic signature registration operations described through FIGS. 3 to 4.

Referring to FIG. 6, when the electronic signature is selected from security registration menus of the terminal, a separate window for the input of the electronic signature is displayed on the display unit 160, and the input for the electronic signature using the electronic pen 200 having the pressed button 200a can be performed in particular positions a1 to b1 while the electronic signature is input to the separate window by using the electronic pen 200.

Alternatively, after the input of the electronic signature has been already completed, a re-input of the electronic signature can be performed in the particular positions a1 to b1 by using the electronic pen 200 having the pressed button 200a.

Accordingly, button interruption coordinate values generated in the particular positions a1 to b1 can be additionally stored in the electronic signature information as the interruption information.

An electronic signature authentication operation in a state where the electronic signature registration is completed through FIGS. 3 to 5 and the electronic signature is set as security will be described with reference to FIG. 7.

Figure 7:
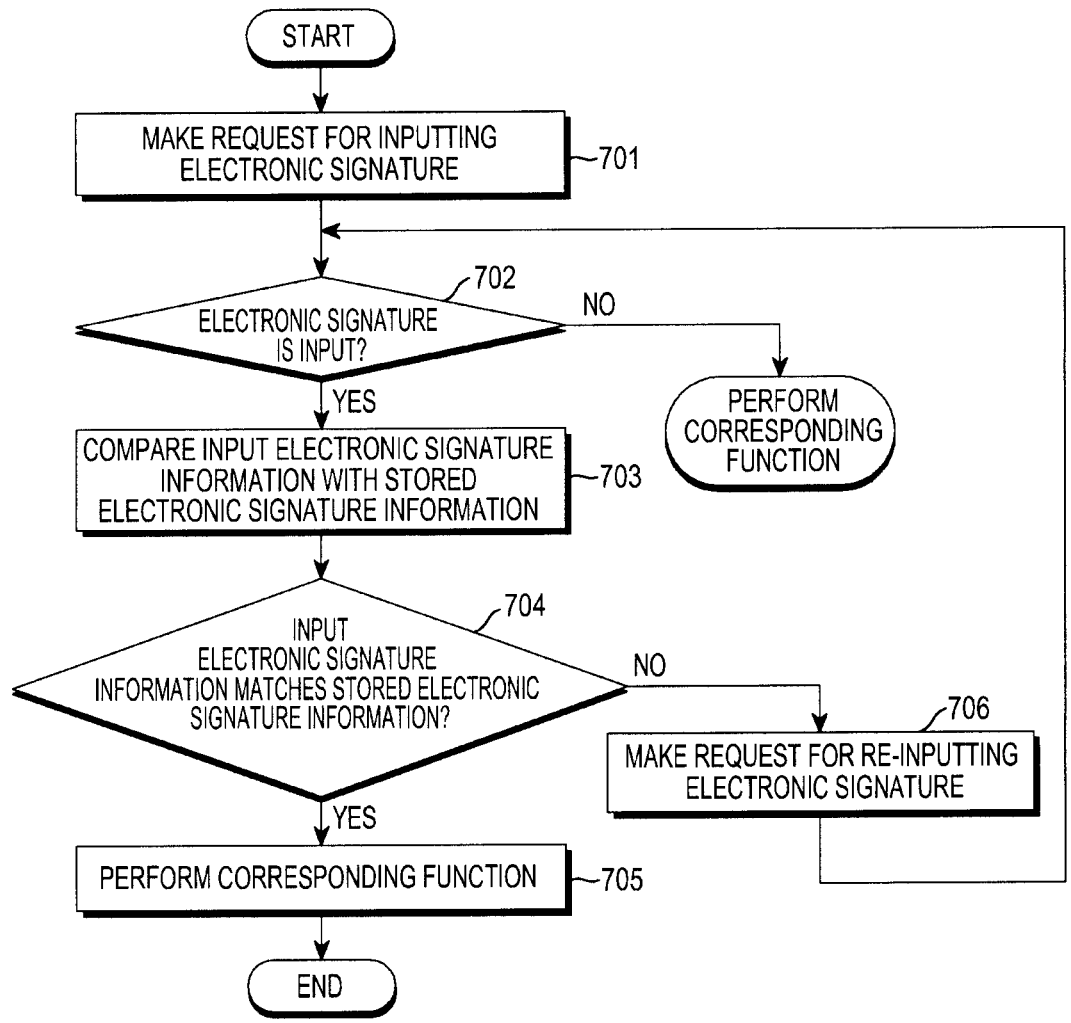
FIG. 7 is a flowchart illustrating an electronic signature authentication process in a terminal according to an embodiment of the present invention.

FIG. 7 is a flowchart illustrating an electronic signature authentication process in the terminal according to an embodiment of the present invention.

Referring to FIGS. 1, 2 and 7, when a corresponding function performance is requested by the user in the terminal in which the electronic signature is set as the security function, the controller 110 detects the request and performs step 701 of making a request for the input of the electronic signature.

When the user inputs the electronic signature according to the input request by using the electronic pen 200, the controller 110 detects the input in step 702, detects electronic signature information on the input electronic signature, and performs step 703 of comparing the detected electronic signature information with electronic signature information stored in the memory 130.

The controller 110 determines whether an image of the electronic signature, basic authentication information, and additionally interruption information match each other in step 703.

As a result of the determination, when the detected electronic signature information matches the electronic signature information stored in the memory 130, the controller 110 detects the matching in step 704, and performs step 705 of performing a corresponding function according to a success of the electronic signature authentication.

However, as the result of the determination, when the detected electronic signature does not match the electronic signature information stored in the memory 130, the controller 110 detects the non-matching in step 704, and performs step 706 of making a request for the re-input of the electronic signature according to a failure of the electronic signature authentication.

Moreover, it is also within the scope of the invention to vary the precision required during comparison step 703. For example, the degree of correspondence necessary in steps 704 can be altered to provide for strict or more lenient security. In an extreme mode, the input signature (an interruptions) in step 702 would only be able to differ by less than 1%, while in a less stringent mode, the difference can be as much as 10%.

Figure 8A:
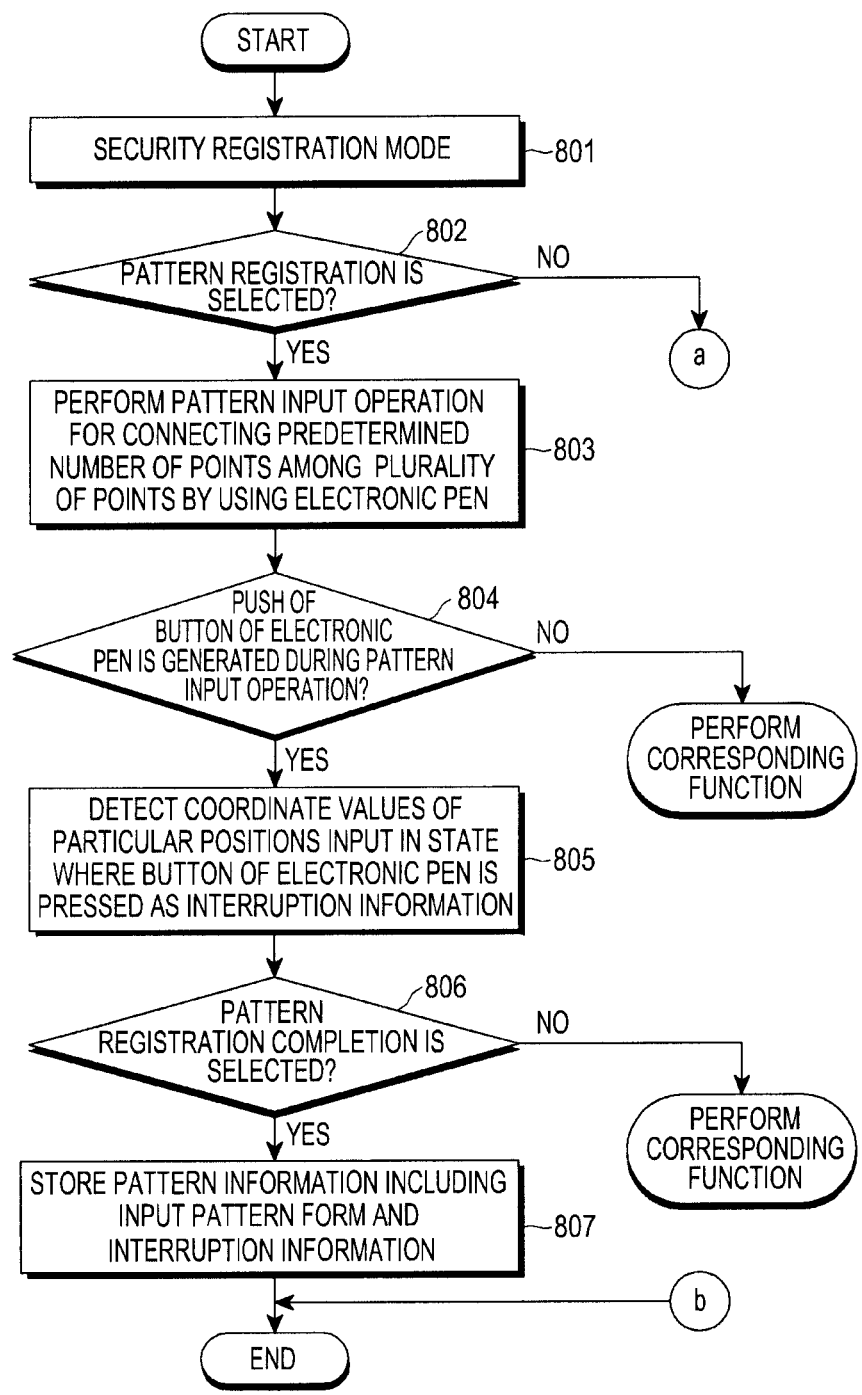
FIG. 8A to FIG. 8B are flowcharts illustrating a pattern registration process or a password registration process in a terminal according to an embodiment of the present invention.
Figure 8B:
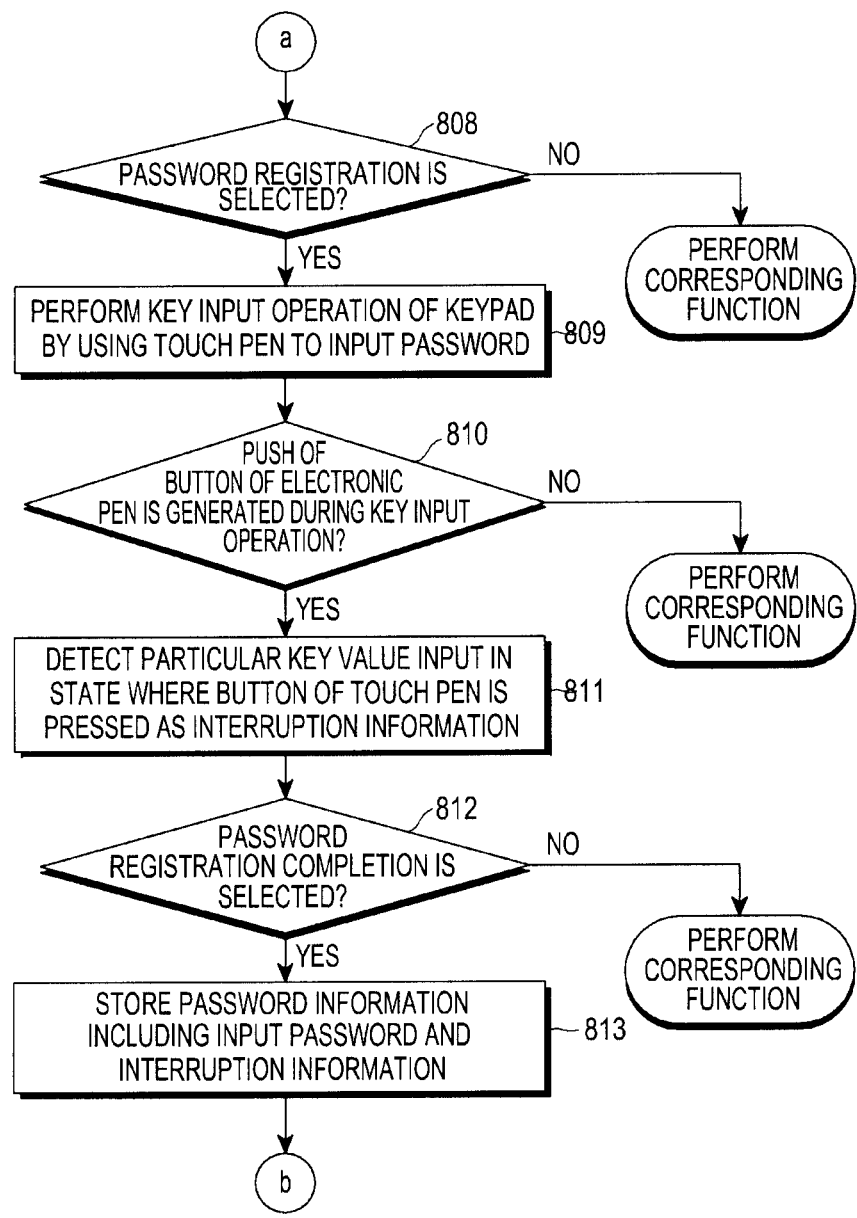

FIGS. 8A to 8B are flowcharts illustrating a pattern registration process and a password registration process in the terminal according to an embodiment of the present invention.

Referring to FIGS. 1, 2, 8A and 8B, when a pattern registration is selected as a security function in a security registration mode in step 801, the controller 110 detects the selection in step 802, and makes a request for a pattern input for the security registration while displaying a plurality of points on the display unit 160.

When the button 200a of the electronic pen 200 is pressed while a pattern input operation for connecting the predetermined number of points among the plurality of points displayed on the display unit 160 is performed using the electronic pen 200 in step 803, the controller 110 detects the push of the button 200a in step 804, and performs step 805 of detecting coordinate values of particular points input by the electronic pen 200 in the state where the button 200a is pressed as separate interruption information.

When an input operation for the particular points starts by using the electronic pen 200 in the state where the button 200a is pressed, the controller 110 performs an operation of detecting button interruption coordinate values from a position where the input operation starts to a position where the input operation ends as the interruption information in step 805.

Through steps 804 and 805, when the user performs the input by connecting the predetermined number of points to be registered as a pattern among the plurality of points by using the electronic pen, the user can perform the input by connecting particular points among the predetermined number of points by using the electronic pen 200 having the pressed button 200a.

Accordingly, the controller 110 detects coordinate values of the input particular points in the state where the button 200a of the electronic pen 200 is pressed as separate interruption information and stores the detected interruption information as additional pattern information to additionally perform a pattern authentication by using the interruption information in a future process of authenticating the pattern.

In general, the pattern authentication may be leaked to another person through a pattern input operation of the user, but the interruption information can be known only by the person who inputs the pattern, so that the interruption information can increase reliability of the pattern security.

When the pattern is input through steps 804 and 805 and a pattern registration completion is selected, the controller 110 detects the completion in step 806, and performs step 807 of storing pattern information containing the pattern type input by the user and the interruption information in the memory 130.

Alternatively, when a password registration is selected as the security function in the security registration mode in step 801, the controller 110 detects the registration in step 808, and makes a request for an input of the password for the security registration.

When the button 200a of the electronic pen 200 is pressed while an input operation of keys corresponding to the desired password among a plurality of keys arranged in a keypad displayed on a partial area of the display unit 160 is performed by using the electronic pen 200 in step 809, the controller 110 detects the push of the button 200a in step 810, and performs step 811 of detecting at least one particular key value input by the electronic pen in the state where the button 200a is pressed as separate interruption information.

Through steps 809 and 810, when the user inputs keys arranged in the key pad by using the electronic pen 200 to input the password to be registered as the security function, the user can input a key corresponding to a desired particular number of the password in the state where the button 200a of the electronic pen 200 is pressed.

Accordingly, the controller 110 detects particular key values input in the state where the button 200a of the electronic pen 200 is pressed as separate interruption information and stores the detected interruption information as additional pattern information to additionally perform a password authentication by using the interruption information in a future process of authenticating the password.

In general, the password authentication may be leaked to another person who can see the password input operation by the user or the key input to the keypad for the password input, but the interruption information can be known only by the person who inputs the password, so that the interruption information can increase reliability of the password security.

When the password is input through steps 809 and 810 and a password registration completion is selected, the controller 110 detects the completion in step 812, and performs step 813 of storing password information containing the password input by the user and the interruption information in the memory 130.

Although the input operation using the electronic pen in the state where the button is pressed with respect to a particular point or a particular key while the pattern or the password is input by using the electronic pen has been described as an example in FIGS. 8A to 8B, the interruption information can be detected, after the input of the pattern or password is completed by using the electronic pen, by performing a re-input operation using the electronic pen in the state where the button is pressed with respect to a particular point of the registered pattern type or a key corresponding to a particular number of the registered password.

Figure 9A:
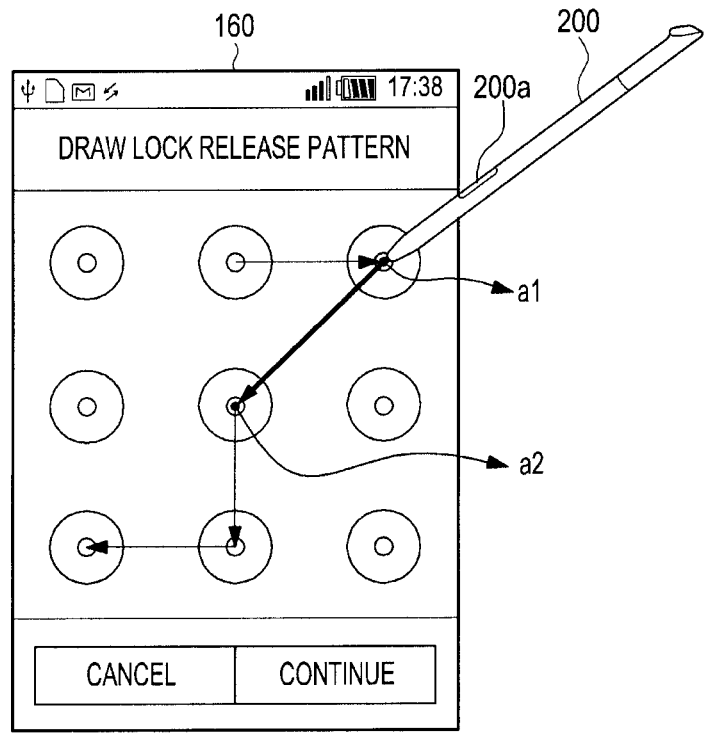
FIG. 9A to FIG. 9B are diagrams for describing a pattern registration operation or a password registration operation in a terminal according to an embodiment of the present invention.
Figure 9B:
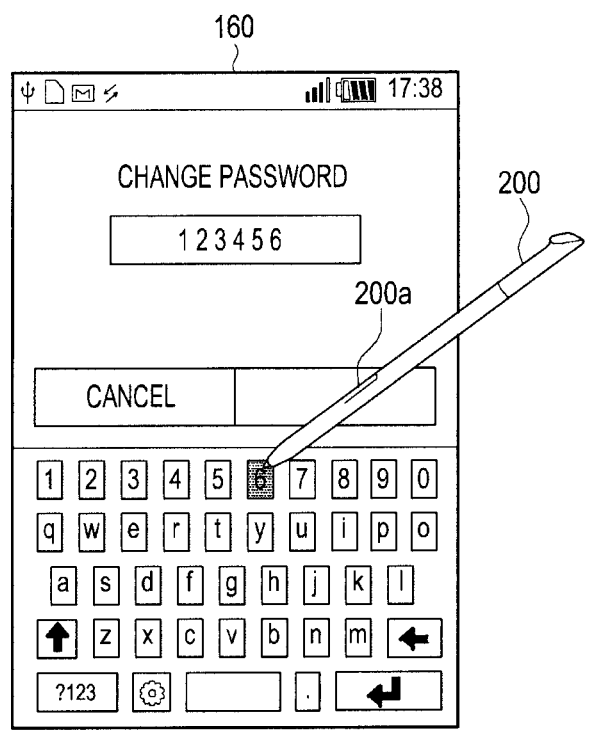

FIGS. 9A to 9B are diagrams for describing a pattern registration operation or a password registration operation in the terminal according to an embodiment of the present invention, and illustrate the pattern registration operation or the password registration operation described in FIGS. 8A to 8B.

Referring to FIG. 9A first, when a pattern registration is selected from security registration menus of the terminal, a plurality of points for the pattern input is displayed on the display unit 160. Further, a pattern to be registered as the security function is input in the plurality of points by using the electronic pen 200, and the pattern input can be performed in particular points a2 to b2 by using the electronic pen 200 having the pressed button 200a while the pattern is input. Accordingly, button interruption coordinate values generated in the particular points a2 to b2 can be additionally stored in pattern information as interruption information.

Further, referring to FIG. 9B, when a password registration is selected from security registration menus of the terminal, a separate window for displaying the password and a keypad for inputting the password are displayed on the display unit 160. In addition, keys corresponding to the password to be registered as the security are input to the keypad by using the electronic pen 200, and a particular key "6" can be input by the electronic pen 200 having the pressed button 200a while the keys corresponding to the password are input. Accordingly, a value of the particular key "6" can be additionally stored in password information as interruption information.

A pattern authentication operation and a password authentication operation in a state where the registration for the pattern or the password is completed through FIGS. 8A to 8B and the pattern or the password is set as the security will be described with reference to FIGS. 10A to 10B.

Figure 10A:
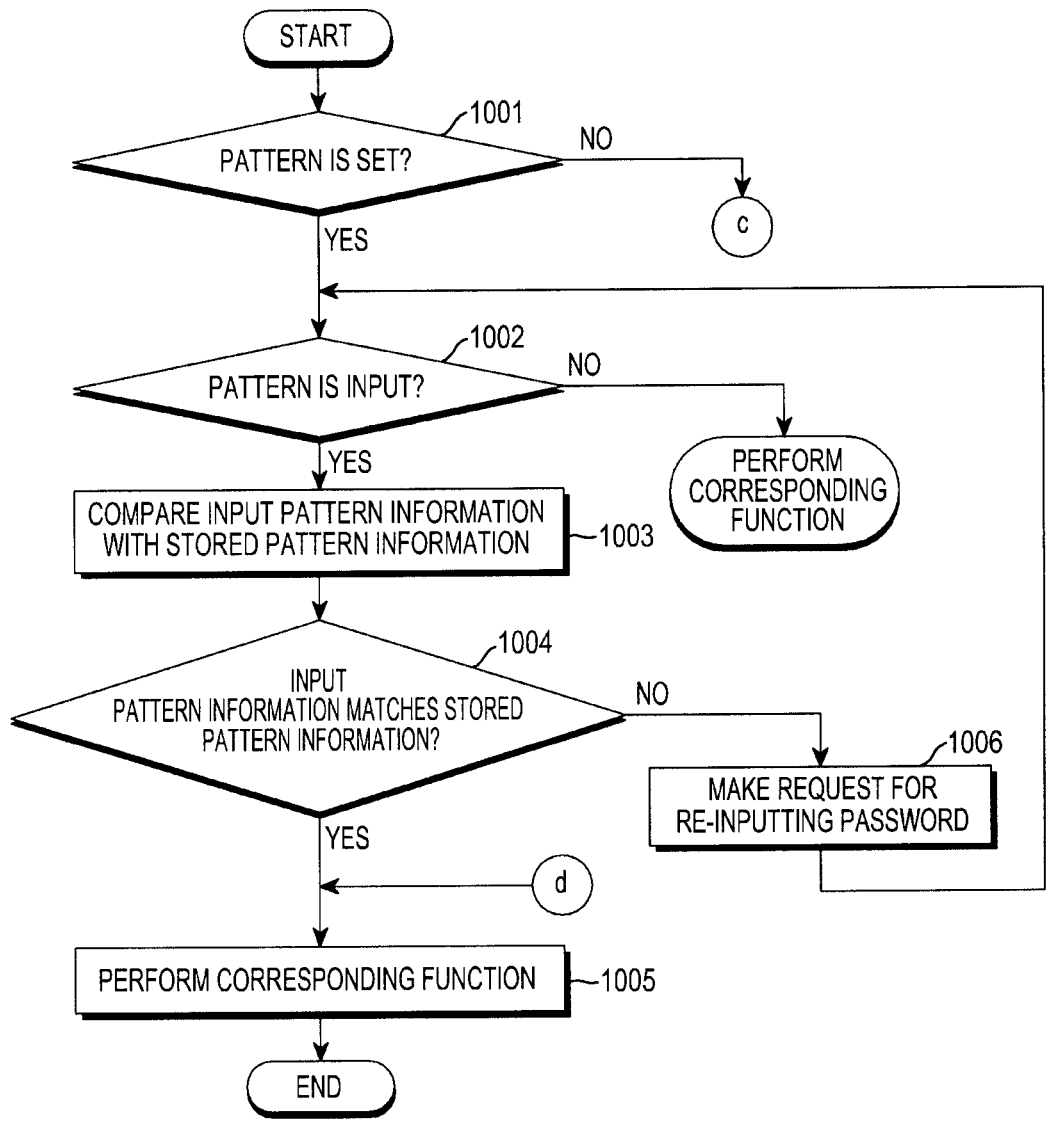
FIG. 10A to FIG. 10B are flowcharts illustrating a pattern authentication process or a password authentication process in a terminal according to an embodiment of the present invention.
Figure 10B:
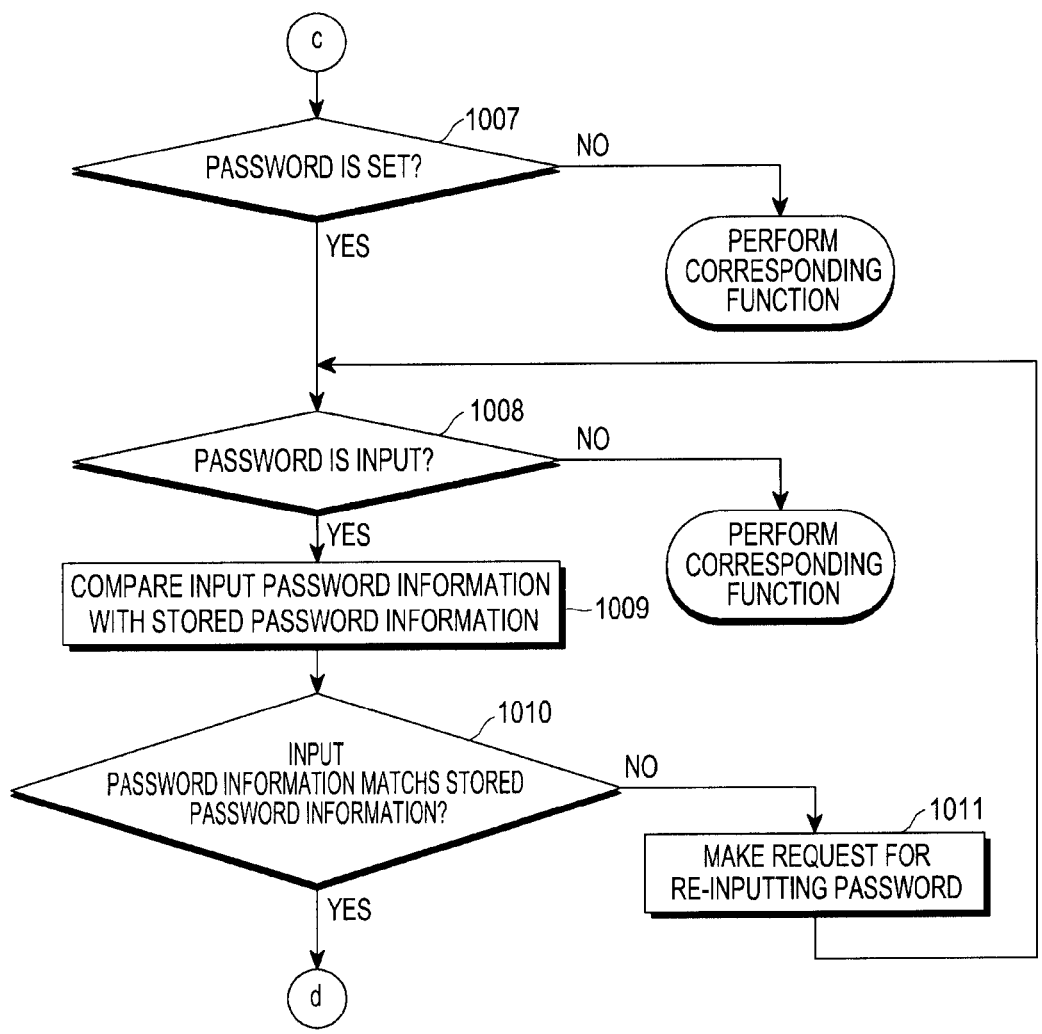

FIGS. 10A to 10B are flowcharts illustrating a pattern authentication process or a password authentication process in the terminal according to an embodiment of the present invention.

Referring to FIGS. 1, 2, 10A and 10B, in a case where a corresponding function performance is requested by the user, when the security of the terminal is set by the pattern, the controller 110 detects the setting in step 1001, and makes a request for an input of the pattern to the user.

When the user inputs the pattern according to the pattern input request by using the electronic pen 200, the controller 110 detects the input in step 1002, detects pattern information on the input pattern, and performs step 1003 of comparing the detected pattern information with pattern information stored in the memory 130.

In step 1003, the controller 110 determines whether a pattern type matches interruption information through which it is known whether a particular point of the pattern type is input by the electronic pen having the pressed button 200a.

As a result of the determination, when the detected pattern information matches the pattern information stored in the memory 130, the controller 110 detects the matching in step 1004, and performs step 1005 of performing a corresponding function according to a success of the pattern authentication.

However, as the result of the determination, when the detected pattern information does not match the pattern information stored in the memory 130, the controller 110 detects the non-matching in step 1004, and performs step 1006 of making a request for re-inputting the pattern according to a failure of the pattern authentication.

In the case where the corresponding function performance is requested by the user, when the security of the terminal is set by the password, the controller 110 detects the setting in step 1007, and makes a request for inputting the password to the user.

When the user inputs keys of the keypad displayed on the display unit 160 according to the password input request by using the electronic pen 200, the controller 110 detects the input in step 1008, detects password information on the input password, and performs step 1009 of comparing the detected password information with password information stored in the memory 130.

In step 1009, the controller 110 determines whether the password matches interruption information through which it can be known whether a particular key corresponding to a particular number of the password is input by the electronic pen 200 having the pressed button 200a.

As a result of the determination, when the detected password information matches the password information stored in the memory 130, the controller 110 detects the matching in step 1010, and performs step 1005 of performing a corresponding function according to a success of the password authentication.

However, as the result of the determination, when the detected password information does not match the password information stored in the memory 130, the controller 110 detects the non-matching in step 1010, and performs step 1011 of making a request for re-inputting the password according to a failure of the password authentication.

Although it has been described as an example that the interruption information detected according to the push of the button arranged in the electronic pen is used as the additional authentication information in embodiments of the present invention, the push of a predetermined key arranged in a key input unit may be used as the additional authentication information in the same way.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention is described with the controller 110 and other functional components being internal to the terminal 100, it is understood that one or more of such functional components, e.g., the data processor 120, memory 130 and audio processor 125, can be integrated with the pen 200. Additionally, while a signature, as used herein, is typically understood to be a person's name, the signature can be any mark, drawing, illustration, pattern or presentment. It is also understood that the electronic pen, as described herein, can be any pointing device capable of being detected by the controller 110.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An apparatus for managing security of a terminal, the apparatus comprising:
    a touch screen configured to receive inputs from an electronic pen;
    a memory; and
    a controller configured to:
        receive and display an electronic signature generated by the electronic pen through the touch screen,
        after the electronic signature is displayed, detect coordinate values generated by a trace of the electronic pen over at least a portion of the displayed electronic signature while an interruption is received by activation of a button of the electronic pen,
        store, in the memory, the electronic signature and the coordinate values as interruption information, the interruption information utilized as additional electronic signature information for authentication, and confirm the electronic signature as authenticated when the detected coordinate values match a prestored sub-portion of the electronic signature, a starting point (a1) of the prestored sub-portion being different than a starting point of the electronic signature, and the starting point (a1) being different than an ending point (b1) of the prestored sub-portion,
    wherein the interruption is transmitted by the electronic pen when the button is pressed, and
    wherein a starting point of the displayed electronic signature is different than a starting point of the prestored sub-portion (a1), and an ending point of the displayed electronic signature is different than an ending point of the prestored sub-portion (b1), and the starting point of the prestored sub-portion (a1) is different than the ending point of the prestored sub-portion (b1).

2. The apparatus of claim 1, wherein the interruption further comprises a particular frequency generated by the activation of the button of the electronic pen, and wherein the electronic signature is confirmed inauthentic when the detected coordinate values fail to match the prestored sub-portion of the electronic signature.

3. The apparatus of claim 1, wherein the coordinate values include input positions of the electronic pen from a position where an input operation for the electronic signature starts to a position where the input operation ends while the button of the electronic pen is activated.

4. The apparatus of claim 1, wherein when a re-input operation is generated in particular positions of the already input electronic signature in a state where a button of the electronic pen is pressed after an input operation of the electronic signature, the controller is further configured to:
    detect the coordinate values for the particular positions where the re-input operation is generated as the interruption information,
    insert the interruption information into the electronic signature as the additional electronic signature information for authentication of the electronic signature, and
    store the electronic signature with the inserted interruption information.

5. The apparatus of claim 1, wherein when the interruption comprises signals corresponding to a push operation of a button of the electronic pen generated after an input operation of the electronic signature, the interruption information further includes at least one of:
    a number of times that the button is activated, a time period the button is activated, and a pattern of the button being activated including the number of times the button is activated, and the time the button is pressed.

6. The apparatus of claim 1, wherein the controller is further configured to:
    in response to receiving a request to authenticate a received electronic signature, compare the received electronic signature with the generated electronic signature and the interruption information stored in the memory,
    wherein the received electronic signature is authenticated when an initial signature of the received electronic signature matches stored electronic signature and a trace over a portion of the initial signature of the received electronic signature matches stored interruption information utilized as the additional electronic signature information.

7. The apparatus of claim 1, wherein the controller is further configured to:
    execute a pattern security registration mode including display of a plurality of positions selectable using the electronic pen;
    receive a pattern selecting particular positions among the plurality of positions while the button of the electronic pen is activated, the selected particular positions connecting a predetermined number of positions among the plurality of positions; and
    detect coordinate values of the selected particular positions as interruption information and insert the interruption information into pattern information as additional authentication information for the pattern, and store the pattern information in the memory.

8. The apparatus of claim 7, wherein the controller is further configured to:
    when receiving input of a candidate pattern in response to a pattern input request, compare the candidate pattern with stored pattern, and
    confirm authentication of the candidate pattern when the candidate pattern matches the stored pattern information and the interruption information.

9. The apparatus of claim 1, wherein the controller is further configured to:
    execute a password security registration mode including display of a keypad including keys, receive input of a password via inputs to the keypad, in which at least one key is selected for the input password while the button of the electronic pen is activated, and detect a value of the at least one key as the interruption information, insert the interruption information into the password as additional authentication information for the password, and store the password.

10. The apparatus of claim 9, wherein the controller is further configured to:

in response to receiving a candidate password input in response to a password input request, compare the received candidate password with a stored password, and confirming authentication of the candidate password when the candidate password matches the stored password and the interruption information.

11. A method of managing security of a terminal, the method comprising:

detecting and displaying, via a touch screen, an electronic signature generated by an electronic pen;

after the electronic signature is displayed, detecting coordinate values generated by a trace of the electronic pen over at least a portion of the displayed electronic signature while an interruption is received by activation of a button of the electronic pen; and storing, in a memory, the electronic signature and the coordinate values as interruption information, the interruption information utilized as additional electronic signature information for authentication, confirming the electronic signature as authenticated when the detected coordinate values match a prestored sub-portion of the electronic signature, a starting point (a1) of the prestored sub-portion being different than a starting point of the electronic signature, and the starting point (a1) being different than an ending point (b1) of the prestored sub-portion, wherein the interruption is transmitted by the electronic pen when the button is pressed, and wherein a starting point of the displayed electronic signature is different than a starting point of the prestored sub-portion (a1), and an ending point of the displayed electronic signature is different than an ending point of the prestored sub: portion (b1), and the starting point of the prestored sub-portion (a1) is different than the ending point of the prestored sub-portion (b1).

12. The method of claim 11, wherein the interruption further comprises a particular frequency generated through activation of the button of the electronic pen, and wherein the electronic signature is confirmed inauthentic when the detected coordinate values fail to match the prestored sub-portion of the electronic signature.

13. The method of claim 11, wherein the coordinate values include input positions of the electronic pen from a position where an input operation for the electronic signature starts to a position where the input operation ends while the button of the electronic pen is activated.

14. The method of claim 11, further comprising:

when a re-input operation is generated in particular positions of the already input electronic signature in a state where a button of the electronic pen is pressed after an input operation of the electronic signature, detecting the coordinate values the re-input operation as the interruption information; and inserting the interruption information into the electronic signature as the additional authentication information for the electronic signature, and storing the electronic signature with the inserted interruption information.

15. The method of claim 11, when a push operation of a button of the electronic pen is generated after an input operation of the electronic signature, wherein the interruption information further comprises at least one of:

the button is activated, a time the button is activated, or a pattern of activating the button including a number of times the button is activated and the time the button is activated.

16. The method of claim 11, further comprising:

receiving a request to authenticate a received electronic signature; and comparing the received electronic signature with the generated electronic signature and the interruption information stored in the memory, wherein the received electronic signature is authenticated when an initial signature of the received electronic signature matches the stored electronic signature and a trace over a portion of the initial signature of the received electronic signature matches the interruption information of the additional electronic signature information.

17. The method of claim 11, further comprising:

executing a pattern security registration mode including display of a plurality of positions selectable using the electronic pen;

receiving a pattern selecting particular positions among the plurality of positions while the button of the electronic pen is activated, the selected particular positions connecting a predetermined number of positions among the plurality of positions; and detecting coordinate values of the selected particular positions as interruption information and inserting the interruption information into pattern information as additional authentication information for the pattern, and storing the pattern information in the memory.

18. The method of claim 17, further comprising:

when receiving input of a candidate pattern in response to a pattern input request, comparing the candidate pattern with the stored pattern information; and confirming authentication of the candidate pattern when the candidate pattern matches the stored pattern information and the interruption information.

19. The method of claim 11, further comprising:

executing a password security registration mode including display of a keypad including keys;

receiving input of a password via inputs to the keypad, in which at least one key is selected for the input password while the button of the electronic pen is activated; and detecting a value of the at least one key as the interruption information, inserting the interruption information into the password as additional authentication information for the password, and storing the password.

20. The method of claim 19, further comprising:

in response to receiving a candidate password input in response to a password input request, comparing the received candidate password with pre-stored password; and confirming authentication of the candidate password when the candidate password matches the stored password and the interruption information.

* * * * *